United States Patent
Fuller et al.

(10) Patent No.: US 6,958,567 B2
(45) Date of Patent: Oct. 25, 2005

(54) ACTIVE/PASSIVE DISTRIBUTED ABSORBER FOR VIBRATION AND SOUND RADIATION CONTROL

(75) Inventors: Christopher R. Fuller, Virginia Beach, VA (US); Pierre E. Cambou, Grenoble (FR)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 131 days.

(21) Appl. No.: 10/429,246

(22) Filed: May 5, 2003

(65) Prior Publication Data

US 2003/0234598 A1 Dec. 25, 2003

Related U.S. Application Data

(63) Continuation-in-part of application No. 09/294,398, filed on Apr. 20, 1999, now Pat. No. 6,700,304
(60) Provisional application No. 60/082,596, filed on Apr. 22, 1998.

(51) Int. Cl.$^7$ .......................... H01L 41/08; A61F 11/06
(52) U.S. Cl. ...................... 310/321; 310/326; 381/71.2; 181/208
(58) Field of Search ............................ 310/316.01, 321, 310/322, 324, 328, 330–332, 366, 800; 381/94, 152, 158, 190, 71, 71.2; 181/206–209, 294–296

(56) References Cited

U.S. PATENT DOCUMENTS

| | | | | |
|---|---|---|---|---|
| 4,158,787 A | * | 6/1979 | Forward | 310/51 |
| 4,565,940 A | * | 1/1986 | Hubbard, Jr. | 310/326 |
| 4,706,788 A | * | 11/1987 | Inman et al. | 188/378 |
| 4,849,668 A | * | 7/1989 | Crawley et al. | 310/328 |
| 4,940,914 A | * | 7/1990 | Mizuno et al. | 310/326 |
| 5,369,925 A | * | 12/1994 | Vargo | 52/244 |
| 5,485,053 A | * | 1/1996 | Baz | 310/326 |
| 5,656,846 A | * | 8/1997 | Yamada | 257/420 |
| 5,719,945 A | * | 2/1998 | Fuller et al. | 381/71.2 |
| 6,191,519 B1 | * | 2/2001 | Nye et al. | 310/316.01 |
| 6,700,304 B1 | * | 3/2004 | Fuller et al. | 310/321 |

* cited by examiner

*Primary Examiner*—Mark Budd
(74) *Attorney, Agent, or Firm*—Whitham, Curtis & Christofferson, P.C.

(57) ABSTRACT

The active/passive absorber for extended vibration and sound radiation control includes principally two layers. The first layer has a low stiffness per unit area which allows motion in the direction perpendicular to its main plane. The second layer is principally a mass layer. These two combined layers have a frequency of resonance close to one of the main structure. The dynamic behavior of the coupled system makes the active/passive absorber a passive absorber; however, the first layer can be electrically actuated to induce motion in the direction perpendicular to its main plane. This addition property induces and/or changes the motion of the mass layer and therefore improves the dynamic properties of the active/passive absorber system. The acive/passive absorber can have multiple mass layers and multiple elastic layers stacked one on top of the other. In addition, the mass layers can be continuous or discretized, and have varying thicknesses and shapes for sections and/or segments in the mass layer.

74 Claims, 8 Drawing Sheets

ACTIVE/PASSIVE DISTRIBUTED ABSORBER FOR VIBRATION AND SOUND RADIATION CONTROL

CROSS-REFERENCE TO RELATED APPLICATIONS

This application is a continuation-in-part (CIP) application of U.S. Ser. No. 09/294,398 filed Apr. 20, 1999, now U.S. Pat. No. 6,700,304, and the complete contents of that application are herein incorporated by reference.

This application claims the benefit of provisional application No. 60/082,596 filed on Apr. 22, 1998.

BACKGROUND OF THE INVENTION

1. Field of the Invention

The present invention generally relates to a vibration absorber and, more particularly, to an active/passive distributed vibration absorber for controlling vibration and sound radiation.

2. Background Description

Active and passive noise reduction control techniques are widely known and commonly used to reduce and/or control vibrations and accompanying sound radiation in vibrating bodies, such as aircraft and the like. In many instances active noise reduction techniques adequately reduce vibrations and noise, but at the cost of expensive and complex control systems. Similarly, passive noise reduction techniques also have been known to reduce vibrations and noise, but these passive systems are typically bulky and heavy and are not effective over low vibration frequencies.

Basically, active vibration control systems use a sensor which detects vibration or noise from a vibrating body. The sensor converts the vibration or noise into a signal and then inverts and amplifies the signal. The inverted signal is then fed back to an actuator (or loudspeaker) which provides the inverted signal to the vibrating body thus reducing the vibration or noise. Active control systems are typically effective at lower frequencies such as below 1000 Hz.

In order to properly take advantage of active control systems, the selection of proper sensors and actuators are critical to the functionality of the active control systems. That is, if an improper sensor or actuator is chosen, the active control system will not properly invert and amplify the signal, and will thus not adequately reduce the vibration and noise of the vibrating body. It is also critical to the functioning of the active vibration control system to properly position the sensor and the actuator on the vibrating body with respect to one another, as well as with respect to the vibrations associated with the vibrating structure. For example, if the sensor and the actuator are not positioned properly, the inverted signal may not be properly amplified in order to cancel the vibration on the vibrating body. Also, it is very important to have a correct feedback circuit with is capable of inverting the signal since such a circuit determines the effectiveness of the vibration control and its frequency range.

In contrast to active control systems, passive damping systems usually are much less complex and costly. However, such damping systems are bulky and are generally only effective at higher frequencies of greater than 500 Hz. It is at these greater frequencies that the dimensions of the passive damping systems are comparable with the wavelength of the vibration of the vibrating body.

It is also common in the practice of vibration control systems to combine active and passive vibration systems. However, such hybrid active/passive dynamic vibration control systems provide improved attenuation over that achieved by the passive system at the expense of the energy added to the system via the control force.

Point tuned vibration absorbers are another method of damping the vibration of a vibrating body. However, a point absorber only controls one frequency at one point and is thus limited in its function to control vibrations over a large area of the vibrating body.

SUMMARY OF THE INVENTION

It is an object of this invention to provide a distributed active vibration absorber, and a distributed passive vibration absorber.

It is another object of this invention to provide a distributed active vibration absorber which includes a sensor for sensing vibrations, a mechanism for deriving a control signal, and a mechanism to achieve feed forward and/or feedback control of the vibration absorber using the control signal.

According to the invention, there is provided a distributed active vibration absorber having multiple resonances layers. In one of the embodiments, the first layer includes an active elastic layer, preferably having a low stiffness per unit area. The second layer is a mass layer, and is adhered to an uppermost top portion of each waved portion of the active elastic layer. A resonance layer then comprises a combination of an active elastic layer and a mass layer. Multiple resonance layers can then be positioned on top of each other, and these resonance layers can have discretized masses (masses which are not connected and do not form an integral "layer") of the same or varying sizes and shapes (e.g., ball bearings, thin flat rectangles, etc.). In another embodiment, the active or passive vibration layer includes an elastic material such as a foam, fiberglass, urethane, rubber, or similar material, and the mass layer is distributed within the elastic material or affixed to the surface of the elastic material. The mass layer may be comprised of discretized mass sections of different size, thickness or shape. In addition, the actuator, such as polyvinylidene fluoride (PVDF), a piezoelectric ceramic or other electromechanical device may be embedded within the elastic material.

The active elastic layer has a low stiffness which allows motion in the direction perpendicular to its main plane. The active elastic layer can also be electrically actuated to induce motion in the direction perpendicular to its main plane. This additional property permits a controller to induce and/or change the motion of the mass layer and therefore improve the dynamic properties of the whole system. These two combined layers have may have any frequency of resonance depending on the main structure and the stiffness, and preferably a frequency of resonance close to one of the main structure.

The active elastic layer is preferably a curved polyvinylidene fluoride (PVDF) layer; however, it may equally be a piezoelectric ceramic, a PZT rubber, an electro mechanical device and the like. In addition, the active elastic layer could also be composed of a completely curved PVDF so that the corrugations completely encircle and become tubular structures supporting the mass layer. The active elastic layer includes electrodes on the surfaces thereof so that the active elastic layer may be electrically activated when a voltage is applied between the first and second electrodes. This electrical activation creates an electric field. It is further contemplated that the active elastic layer is a piezoelectric material which mechanically shrinks and expands under an influence of the electric field. To this end, a distance between two planes on opposing sides of the mass layer changes when the active elastic layer mechanically shrinks and expands under the influence of the electric field.

It is preferable that the mass layer weighs no more than approximately 10% of an overall mass of the vibrating structure, andhe thickness of the mass layer is proportional to a weight per unit area of the vibrating structure. However, the mass layer may be more than 10% of the overall mass of the vibrating structure. It is further contemplated by the present invention to have a mass layer which is larger in areas where the vibrating structure has modal contributions of a large amplitude compared to where the vibrating structure has modal contributions of a smaller amplitude.

The mass layer may also have a constant mass with a constant thickness or a constant mass with a varying thickness according to modal contributions of the vibrating body. It is preferable that the mass layer matches locally varying response properties of the vibrating structure, especially when the thickness of the mass layer varies.

The mass layer may also may be discretized in the axial direction of the device in order to facilitate matching of the varying response of the vibrating structure.

In further embodiments, the active elastic layer includes sheets of plastic adhered to each side so as to prevent axial motion of the active elastic layer.

Accordingly, the DAVA can be tuned mechanically and electrically to reduce unwanted vibration and/or sound. The first layer is made of active material with low stiffness and allows the motion of a second layer made of a dense material. The layers, which may be multiple layers with multiple resonance frequencies, or multiple discretized layers are designed to modify globally the repartition of the kinetic energy. Moreover, the DAVA of the present invention controls the vibration over an entire or a large area of the vibrating structure over multiple frequencies, and can be electrically activated.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

The distributed active vibration absorber (DAVA) of the present invention is preferably limited to the mass that can be used to damp a structure under vibration. Typically, the DAVA of the present invention does not weigh more than 10% of the overall mass of the structure; however, in applications the DAVA may weigh more than 10% of the overall mass of the structure. For the area with the most motion and therefore with potentially large modal contributions, the mass of the DAVA is expected to be larger compared to an area with small motions. Also, the efficiency of the DAVA is larger if the local resonance of the distributed absorber in this area is close to the excitation frequencies of the disturbance. For the other areas, the resonance frequency might be higher than this excitation or lower than this excitation. Locally, the DAVA has approximately the same resonance frequency as a known point absorber such that the mass allocated locally is a fraction of the total mass and for this reason the local stiffness is a fraction of the global stiffness. The DAVA of the present invention is a distributed system which controls the vibration over the entire or large area of the vibrating structure over multiple frequencies, and preferably can be electrically activated.

Figure 1:
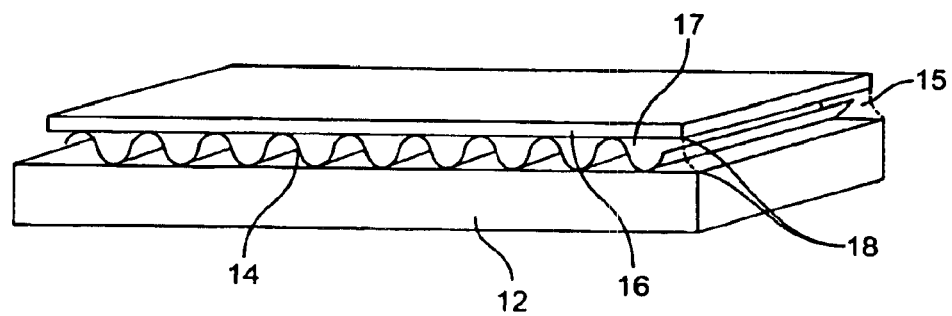
FIG. 1 shows a schematic of a distributed active vibration absorber (DAVA) of a first embodiment of the present invention.

FIG. 1 shows a schematic of a distributed active vibration absorber (DAVA) of a first embodiment of the present invention. In the preferred embodiment, the design of the present invention follows a two layer design. The first layer 14 is an active elastic layer with low stiffness per area that can be electrically activated, and is preferably polyvinylidene fluoride (PVDF) having a thickness of 10 $\mu$m. The first layer 14 may also be a piezoelectric ceramic, a PZT rubber, metals, an electro mechanical device and the like. The active elastic layer 14 may also be an elastic material, as identified by dashed lines 15 (e.g., foam) with embedded electrical actuators (e.g., the layer 14). Almost any material, e.g., acoustic foam, rubber, urethane, acoustic fiberglass, can be used, and the electrical actuators may be PVDF, PZT rubber, metals (those having spring like qualities such as spring steel), polymers (those having elastic or spring like qualities such as plastic), piezoceramics, or other electrical mechanical devices.

An active elastic layer 14 will be used hereinafter throughout the specification for illustrative purposes. However, it is well understood that any of the above-referenced materials and other materials or multiple layers of materials well known in the art of vibration control may be equally implemented with the present invention. Moreover, for clarity purposes, like numerals will be used for like elements throughout the remaining portions of the specification.

Still referring to FIG. 1, the active elastic layer 14 is preferably curved (e.g., waved surface) to increase the amplitude of motion and decrease the stiffness of the system. In the embodiments of the present invention, the active elastic layer 14 is lightweight and resistant to bending, and preferably has the same design characteristics as corrugated cardboard. The second layer 16 is a distributed mass layer (e.g, absorber layer) which may have a constant thickness and may be comprised of a thin sheet of lead. It is well understood, however, that the mass distribution of the mass layer 16 may include varying masses or discretized masses of general shapes within the mass layer 16 along the entire or large area of the structure 12, and other appropriate thin sheet material, such as, steel, aluminum, lead, composite fiberglass material and the like may be used when practicing the present invention. In the embodiments using the varying mass distribution, the varying mass distribution will alter the local properties of the DAVA to ideally match the locally varying response properties of the base structure. It is also well understood that the DAVA is not limited to a two layer system of an active elastic layer and a mass layer, but may be a multiple layered system using the inventive concepts described herein, for example, a three or more layered system having at least one active elastic layer and at least one mass layer.

The mass layer 16 is designed to weigh 10% of the structure 12, and the thickness of the mass layer 16 depends directly on the weight per unit area of the structure 12. For example, for a steel beam or plate, the maximum thickness of a uniform lead layer can be easily calculated, neglecting the weight of the active elastic layer 14 as follows:

$$h_m/h_p = (\rho_b/\rho_m)*10\% = 78000/11300*10\% = 7\%$$

Thus, for a steel beam of 6.35 mm, the maximum thickness of the mass layer 16 of the DAVA of the present invention is 0.44 mm. This is assuming that the DAVA covers the entire or large area of the surface of the structure 12 (e.g., beam). With this weight limitation, the active elastic layer 14, such as the curved PVDF layer, should be provided with a very low stiffness. This is especially true for the control of low frequencies. For example, with a 1 mm thick mass layer 16 (made of lead), the stiffness of a 2 mm thick active elastic layer 14 is 9e+5 N/m in order to obtain a design resonance frequency at 1000 Hz. However, as previously discussed, the DAVA is capable of controlling the vibration over the entire or large area of the vibrating structure over multiple frequencies.

As briefly discussed above, it is well understood that further embodiments of the present invention may include multiple layers of active elastic layers 14 and mass layers 16. By way of example, at least two active elastic layers 14 may be alternately stacked with at least two mass layers 16. In the further embodiments, each active elastic layer 14 may tuned separately and each mass layers 16 may have a different mass in order to control different frequencies of the vibrating structure. Of course, the embodiments of the present invention are not limited to the above illustrative example, and may equally include more or less active elastic layers 14 (tuned to control different frequencies) and include more or less mass layers 16 (having different masses).

Preferably, on each side of the actuator, e.g., active elastic layer 14, are two thin layers of silver which act as electrodes 15. When a voltage is applied between these electrodes 17 (which can be placed anywhere on the active elastic layer-preferably on opposite sides thereof), an electric field is created within the active elastic layer 14. The active elastic layer 14 is preferably a piezoelectric material which mechanically shrinks and expands under the influence of an electric field.

Figure 2:
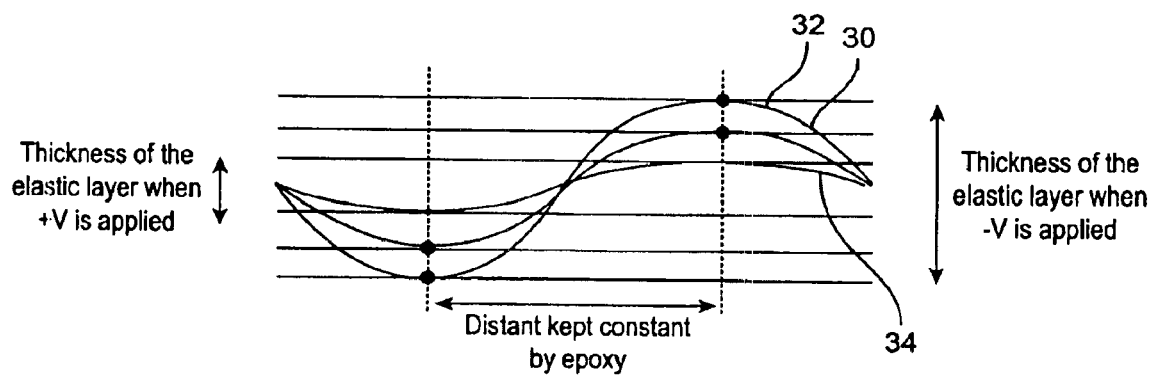
FIG. 2 shows the motion of the active elastic layer of the DAVA under electrical excitation.

FIG. 2 shows the motion of the active elastic layer 14 under electrical excitation. FIG. 2 may alternatively represent points where the active elastic layer 14, shown in FIG. 1, is glued with epoxy on two thin sheets of plastic 18 and where it contacts the structure 12 and mass layer 16 (which can be lead or other suitable material). The two sheets of plastic 18 on both sides of the active elastic layer 14 prevent any axial motion. Line 30 represents the active elastic layer 14 at rest and line 32 represents the active elastic layer 14 when -V is applied. Furthermore, line 34 represents the active elastic layer 14 when +V is applied. As seen clearly from FIG. 2, the length of the active elastic layer 14 changes when a voltage is applied to the active elastic layer 14, and as a consequence, the distance changes between the two planes on each side of the mass layer 16. The design of the DAVA transforms the in-plane motion of the active elastic layer 14 into the out-of-plane motion of the active elastic layer 14. FIG. 2 exaggerates the manner in which the shape of the active elastic layer 14 might bend under different stress configurations and, in fact, the motions of the active elastic layer 14 are small and are thus assumed linear.

For simplicity in analysis, it should be understood that the corrugated member, e.g., active elastic layer 14 (see FIG. 1), constitutes a plurality of springs. These are easily compressed without the mass 16, but once the mass 16 is applied, they are not easily compressed. Moreover, the mass 16, once applied, is then distributed over a plurality of springs.

Figure 3:
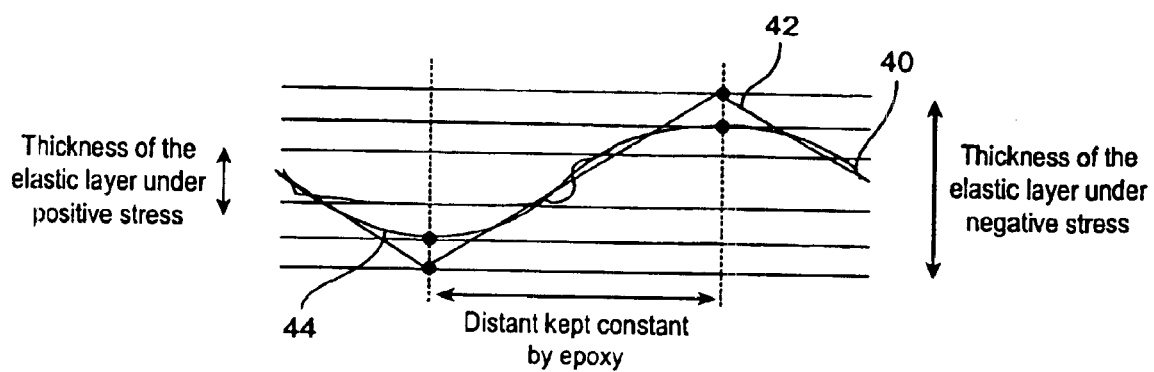
FIG. 3 shows the motion of an active elastic layer of the DAVA under mechanical excitation.

FIG. 3 shows the motion of the active elastic layer 14 under mechanical excitation. Specifically, line 40 represents the active elastic layer 14 at rest and line 42 represents the active elastic layer 14 when a negative load is applied thereto. Furthermore, line 44 represents the active elastic layer 14 when a positive load is applied thereto. When the DAVA is constrained by mechanical forces, the length of the active elastic layer 14 does not change; however, the shape of the active elastic layer 14 is modified. It is noted that the bending stiffness of the mass layer 16 is not taken into account in the simulation since the shear of the mass layer 16 is neglected.

It is of import to note that the stiffness per unit area is low; however, the stiffness of the entire DAVA distributed over an extended area of the vibrating structure is high. It is also important to note that the stiffness (and mass) and thus resonant frequency of the DAVA may be adjusted depending on the particular application of the DAVA; however, the bending stiffness depends on the spatial wavelength and amplitude of the corrugated part of the active elastic layer 14 such that a larger wavelength reduces the bending stiffness in the normal direction. It is further noted that the bending stiffness of the DAVA in the perpendicular direction is extremely high and is preferably similar to a honeycomb structure. Moreover, the transverse stiffness of the DAVA is locally small, and globally the DAVA has the same stiffness as a point absorber with similar mass. Thus, the DAVA is globally very resistant to crushing although an individual sheet of the active elastic layer 14 is very flexible.

The transversal stiffness and thus the resonant frequency of the active elastic layer 14 can be adjusted by the height of the active elastic layer 14, the wavelength of the corrugated active elastic layer 14, the thickness of the active elastic layer 14, and the electric shunt between the electrodes of the active elastic layer 14. Specifically, increasing the thickness of the active elastic layer 14 reduces the transversal stiffness of the DAVA. In order to have a device conformal to the extended area of the vibrating structure (as is in the present invention), this thickness cannot be increased very much. The second parameter that can be modified is the wavelength of the active elastic layer 14 such that a larger wavelength decreases the transversal stiffness of the active elastic layer 14. This parameter change is also limited since the wavelength should stay small in comparison to the wavelength of the disturbance, otherwise the DAVA may loose its distributed properties.

The thickness of the active elastic layer 14 is another parameter that can be adjusted in order to affect the stiffness of the DAVA. For example, a thinner active elastic layer 14 will lower the stiffness of the active elastic layer 14. The last solution to modify the transversal stiffness of the active elastic layer 14 is to use the piezoelectric properties of the active elastic layer 14. For example, electric shunts can provide slight changes in stiffness of the active elastic layer 14. Thus, when an active input is provided to the active elastic layer 14, the active elastic layer 14 can be controlled to behave as if its mechanical stiffness was smaller or larger.

Figure 4:
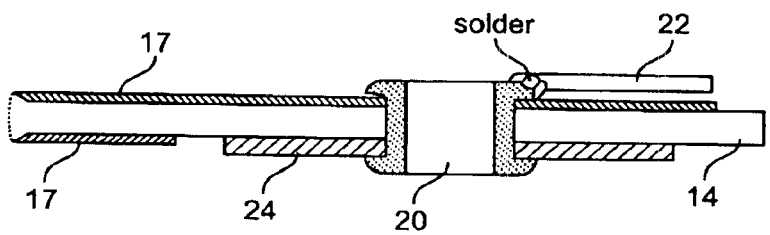
FIG. 4 shows a schematic of a connection to an electrode of the DAVA.

The DAVA can be prepared by cutting a PVDF sheet, or other similar sheet as described above, along its main direction (PVDF has a direction in which the strains will be greater under active excitation, and this direction is the main vibration direction of the absorber and based structure). Then, preferably 1 to 2 mm of the silver electrodes are removed on the edge of the PVDF sheet. In the preferred embodiments, acetone is a very good solvent for removing the silver electrodes 17. The third step is to install a connector linked to each electrode 17. FIG. 4 shows a schematic of a connection to an electrode of the DAVA. Specifically, two areas at one end of the active elastic layer 14 are selected to support a rivet 20. These areas should have an electrode 17 only on one side thereof. One electrode 17 is removed for each area so that the rivet 20 will only be in contact with one electrode 17. A hole slightly smaller than the diameter of the rivet 20 is cut in these areas, and a top of each rivet 20 is soldered to a wire 22 so that it can be properly positioned using riveting pliers. In embodiments, an additional piece of plastic 24 can be placed on the backside of the active elastic layer 14 in order to provide a more robust connection. The rivet 20 is then placed in the rivet holes using riveting pliers known in the art. An additional wire (not shown) is connected to the other electrode and the two wires are then soldered to an electrical connector. The precision with which this connection is built is important, since very high voltages can drive the PVDF active part of the DAVA. It will be understood by those of skill in the art that many other forms of electrical connection may be used within the practice of the present invention.

The active elastic layer can then preferably be corrugated to suitable specifications given the structure whose vibrations are to be damped. This can be accomplished in a number of ways. One preferred method contemplates setting the PVDF between a set of calibrated steel pins and holding it in place for a period of days. Plastic sheets (not shown) may be adhered to either side (top and bottom) of the PVDF for ease in adhering the PVDF to the structure whose vibration is to be damped, and in adhering the mass to the PVDF (e.g., glue or other suitable joining material can be applied uniformly to plastic sheets after the sheets are affixed to the corrugated structure. In addition, the plastic sheets may serve to electrically isolate the PVDF from the vibrating structure and/or applied mass. Also, the corrugated PVDF might be positioned within a foam or other elastic material. This can be accomplished by depositing elastic material on the surfaces of the PVDF, and or inserting the PVDF into an elastic material. As explained above, alternative actuator materials may also be employed instead of PVDF (e.g., metals, piezo ceramics, etc.).

The PVDF may also be completely curved so that the corrugations encircle themselves so as to form tubular structures which support the mass. In some passive applications other materials such as plastic or spring steel can be used to construct the tubes as in a corrugated spring layer.

Figure 5:
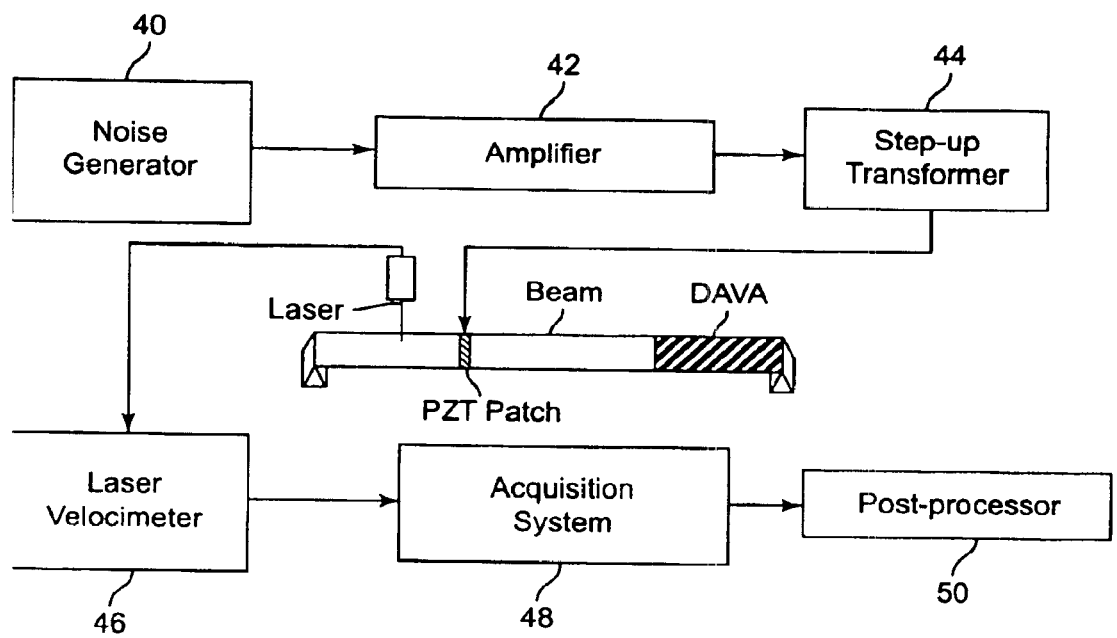
FIG. 5 shows the experimental setup used to measure the performance of the DAVA compared to a point absorber.

FIG. 5 shows the experimental setup used to measure the performance of the DAVA compared to a point absorber. This same experiment is also aimed at tuning and validating the simulation. A noise generator 40 provides a white noise signal of frequency band of 0 to 1600 Hz. This signal is then amplified at amplifier 42 and passed through a voltage step-up transformer 44. The output of the transformer 44 is used to drive the PZT which then actuates a supported beam. A laser velocimeter 46 measures the normal velocity along the beam, and its output is acquired by a data acquisition system 48 (e.g., a personal computer, acquisition card and associated software). A personal computer 50 is then used to post-process the data.

Figure 6:
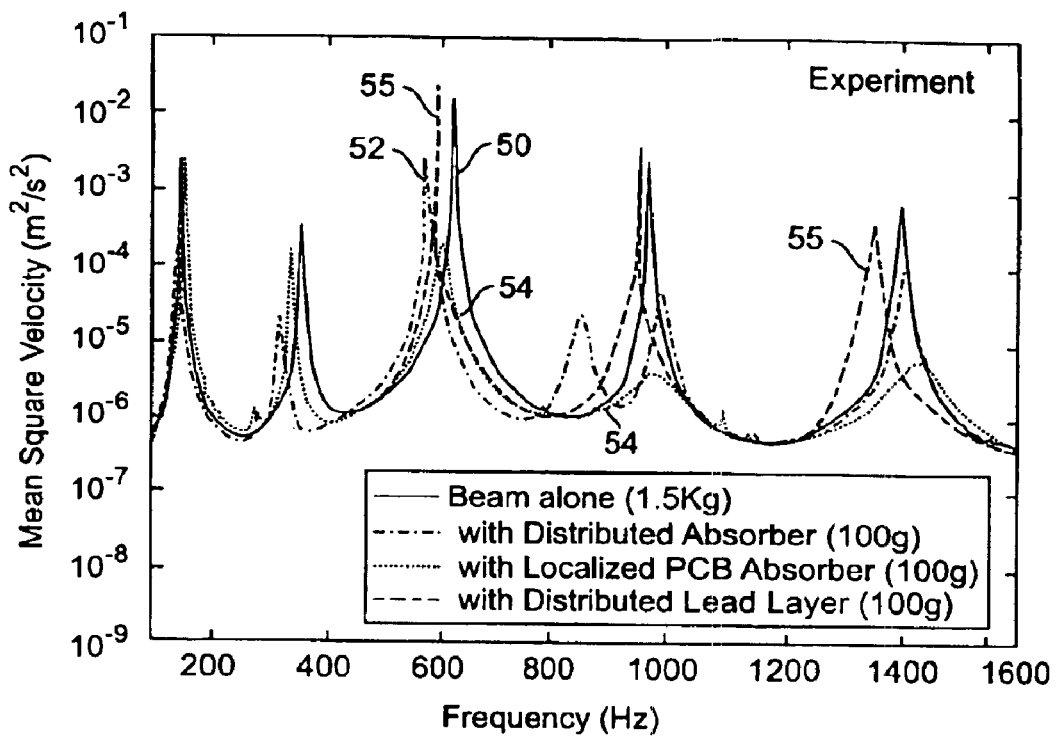
FIG. 6 shows the results of a test rig shown in FIG. 5 with a 6" distributed absorber (not activated) of 100 g weight, a point absorber of 100 g weight, and a distributed mass layer of 100 g weight.

FIG. 6 represents the mean square velocity of the beam. This data can be associated to the average kinetic energy of the beam, and is computed by summing the squared velocities of every point and by dividing by the number of points (e.g., 23). The mean square velocity is normalized per volt of excitation, and is presented from 100 Hz to 1600 Hz. This frequency band does not include the first mode of the beam, which is at 40 Hz. All of the lines of FIG. 6 except line 50 show vibration control systems having the same mass.(e.g., local and distributed absorbers have 100 g). Line 50 represents the measurement of the beam alone such that the second to the sixth mode of the beam can be observed in order. The line 52 represents the behavior of the beam with a 100 g point absorber. The resonance frequency of this absorber is 850 Hz, and will have an effect on the fifth mode. This mode is split in two resonances with smaller peak values. Note that while the point absorber reduces the vibration at its attachment point, it actually increases the mean squared velocity of the beam. With a better tuning (resonance frequency of the absorber at 1000 Hz) these peak values would be slightly moved to the right of the axis and centered around 1000 Hz. The line 54 represents the behavior of the beam with the DAVA. In this experiment, the DAVA is used as a passive device. The attenuation provided by the DAVA can be seen to be different from the point absorber. At nearly all frequencies the DAVA provides better global attenuation of the beam vibration than the point absorber, especially at the modal resonance peaks. Similar results are shown in the simulation set up of FIG. 7. The lines 50, 52, 54 of FIG. 6 are the same as lines 50, 52, 54 of FIG. 7. Significant reduction is also achieved for the third, fourth and sixth mode. Note that the point absorber achieves very small reduction in comparison. The added mass denoted by line 55 in FIG. 6 and line 55 in FIG. 7 demonstrates only a slight change in the resonance frequencies and adds only a little damping. A distributed mass of the same weight does not provide nearly as much vibration attenuation as the DAVA. As can then be seen, the DAVA works by using a dynamic effect (reactive force) to control the beam vibration similar in concept to the point absorber, but over a distributed area, hence its improved performance.

Figure 7:
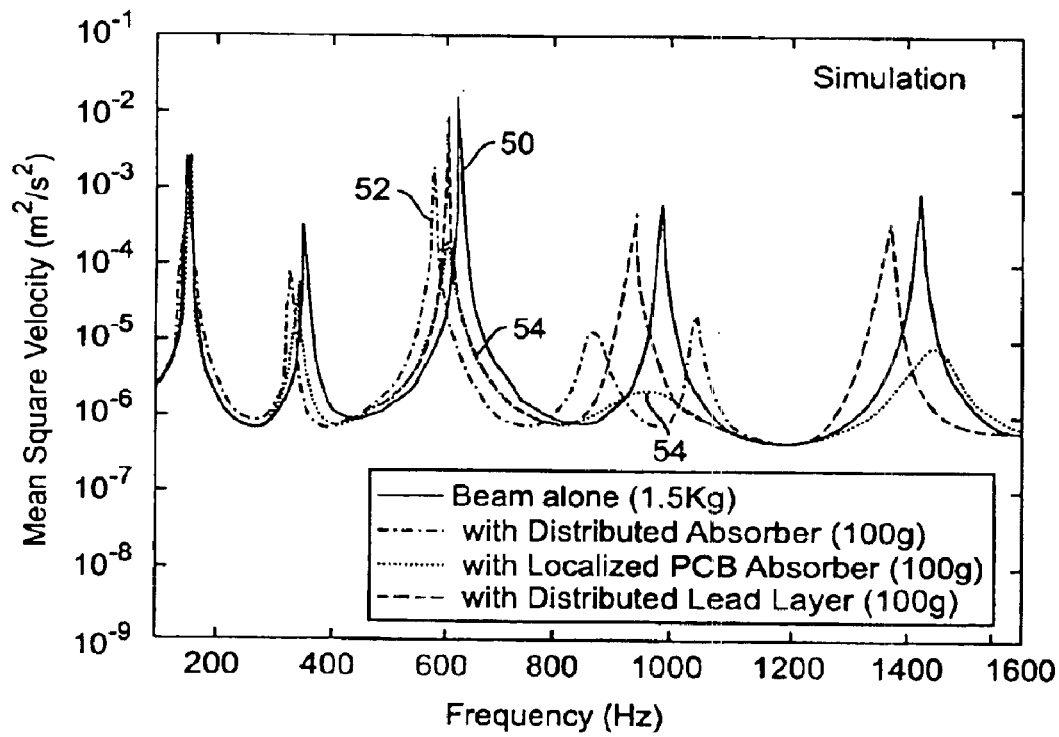
FIG. 7 shows a graph representative of the results of the simulation set up of FIG. 5.

The simulation of FIGS. 6 and 7 show clearly the difference between the two types of absorbers, e.g., point absorber and the DAVA of the present invention. For example, the point absorber is very efficient at reducing the response at a single frequency and at a single point on the vibrating structure. The energy is just moved to different frequency bands and two new resonance are created. However, the DAVA does not have this drawback, and the mean squared vibration energy of the beam is diminished for all the resonance frequencies of the beam and there is no new appearance of resonance. Thus, the DAVA is potentially able to control several modes at a time at different frequencies. This property might be extremely useful for the damping of modally dense structures such as plates.

Figure 8:
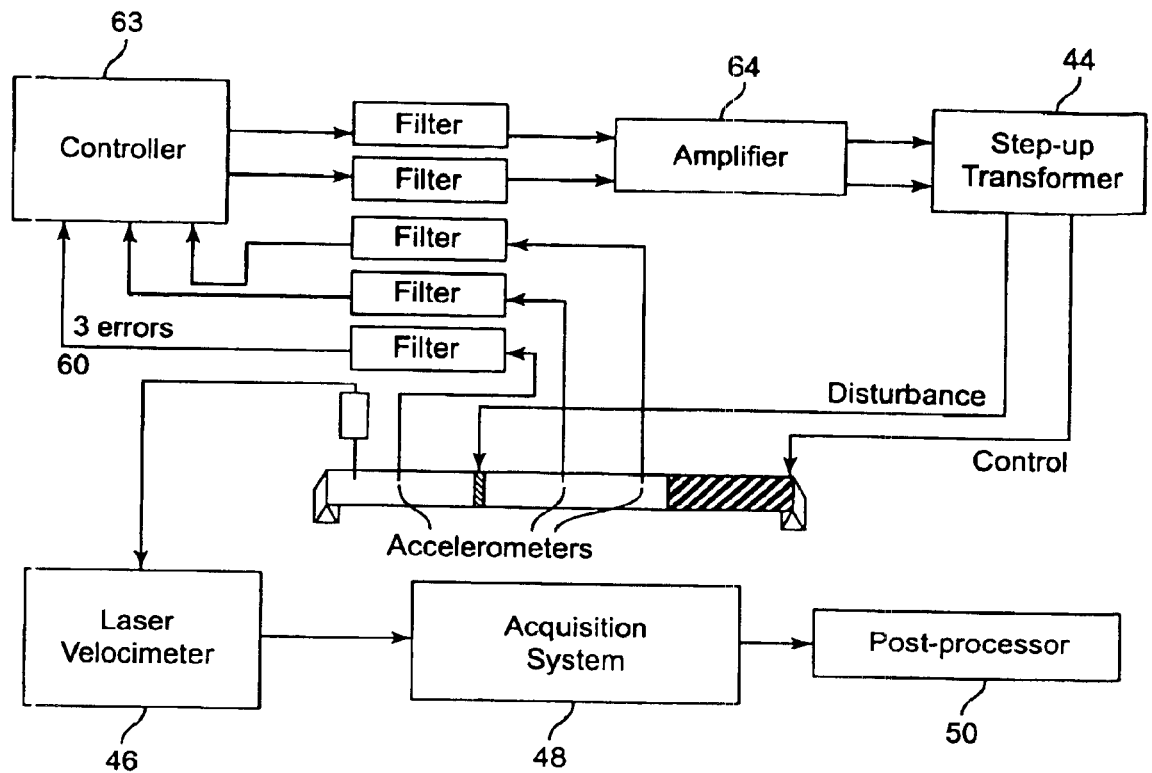
FIG. 8 shows an active control experiment performed using the DAVA of the present invention.

FIG. 8 shows an active control experiment performed using the DAVA of the present invention. The control system employs three accelerometers 60 as error sensors, pass-band filters 64, and a feed forward LMS controller 62 (implemented on a C40 DSP board). The vibration measurements are again performed with the laser velocimeter 46. The disturbance is again white noise generated by the same DSP used to implement the controller 62. The controller 62 attempts to minimize the error sensor signals by controlling the beam with the active part of the DAVA. All the inputs and outputs of the controller are filtered with band pass filters 64. The control algorithm is the LMS algorithm which is well known in the field of vibration control and which optimizes a set of N adaptive filters in order to minimize an error signal knowing a set of inputs. The algorithm can be used to model a linear system. A gradient method is used to find the optimum weight to be associated with the N past values of the system inputs. The error signal used for the gradient search is the difference between the real output of the system and the output of the adaptive filter.

Figure 9:
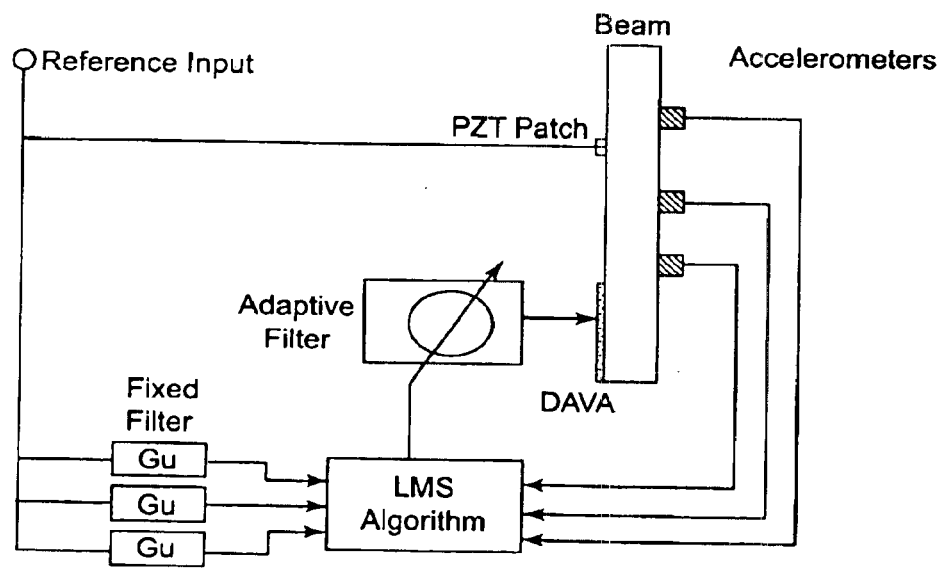
FIG. 9 shows a layout of a controller and test rig used with the present invention.

FIG. 9 shows a layout of a controller and test rig to test the performance of the DAVA. In this experiment, the disturbance signal is also used as the reference signal and has to be filtered by estimate of the transfer function between the DAVA and each error sensor (accelerometers) 60 of FIG. 8. These transfer functions are obtained by system identification using the LMS algorithm, and the controller software minimizes the vibration at the error sensor locations using the active input on the DAVA. The different parameters for this active control experiment are presented in Table 1.

TABLE 1

| Parameters for Active Control | |
|---|---|
| Error Sensors | 3 |
| Active Absorbers | 1 |
| Disturbances | PZT Patch |
| Reference | Internal |
| Sampling Frequency | 5000 Hz |
| System ID filter coefficients | 120 |
| Control Path Filter Coefficients | 180 |

The error sensors 60 were respectively positioned at −7.5", −1.5", and 5.5" from the center of the beam. Vibration measurements were performed using the laser velocimeter every inch of the beam (e.g., 23 points overall).

Figure 10:
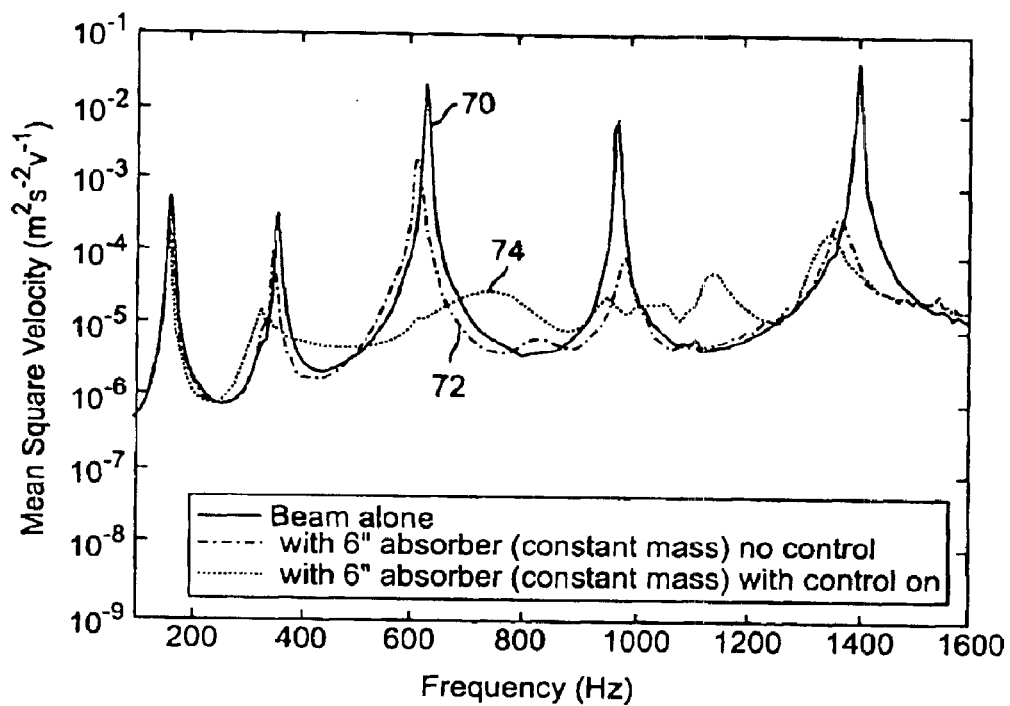
FIG. 10 shows results of an active control experiment with a constant mass distribution DAVA.

The mean square velocity is computed from summing the square of the velocity amplitude of response at each point and taking the mean. The mean squared velocity is thus proportional to the total energy of vibration in the beam and is presented in FIG. 10. Specifically, FIG. 10 shows the active control experiment with the DAVA of the present invention (constant mass distribution). The line 70 represents the behavior of the beam with no devices attached to it and thus represents a baseline for comparison. The line 72 represents the behavior of the beam with a DAVA attached and acting as a passive device(i.e. no control signal applied). The results for the passive DAVA show good attenuation of the total beam energy at all the resonance frequencies The reduction in mean square velocity obtained in this passive configuration is 10 dB for the frequency band of 100–1600 Hz. The results thus illustrate the two key passive aspects of the DAVA; control of vibration throughout the complete beam and control at multiple frequencies simultaneously. This should be contrasted to a conventional point vibration absorber which typically only controls vibration at one point and a single frequency. With the active control on, an additional 3 dB attenuation in mean squared velocity is obtained. The behavior of the beam controlled actively by the DAVA is presented by the line 74. The performance of the active system is very good at reducing the resonance peaks, for example, a 20 dB reduction is obtained at 600 Hz which is the most important peak before control. In between resonances, the active control increases the vibration (termed control spillover), which can be easily corrected by using a better controller and more error sensors. With the active control on, the structure has a non-resonant behavior, and the DAVA adds a significant damping to the system. No active control is obtained below 400 Hz due to the response of the PVDF and of the absorber itself. Other active elements such as electromagnetic actuators would lower this operational active frequency.

In order to increase the efficiency of the DAVA, the mass distribution is optimized. That is, in order to provide an increased attenuation, the mass layer 16 will preferably vary along the length of the entire or large area of the beam. The varying mass distribution will alter the local properties of the DAVA to ideally match the locally varying response properties of the base structure. However, because the beam/DAVA response is complicated along the beam it is sometimes necessary to derive an optimal process for choosing the mass distribution.

Figure 11:
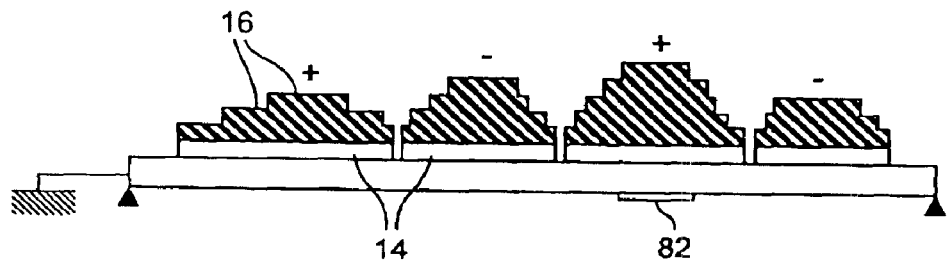
FIG. 11 shows the DAVA with optimally varying mass distribution.

FIG. 11 shows the DAVA with optimally varying mass distribution. The sign on top of each part of the DAVA refers to the polarity of the elastic PVDF sheet 14 in respect to the piezoelectric drive patch (the disturbance). It is noted that the beam response used in the optimization procedure is strongly dependent upon the disturbance location, and that the maximum reactive dynamic effect of the DAVA occurs in direct opposition to the disturbance. The thickness of the mass layer 16 may be varied, while the mass remains constant. The mass variation may be as a continuous element or in discrete sections as illustrated in FIG. 11.

Figure 12:
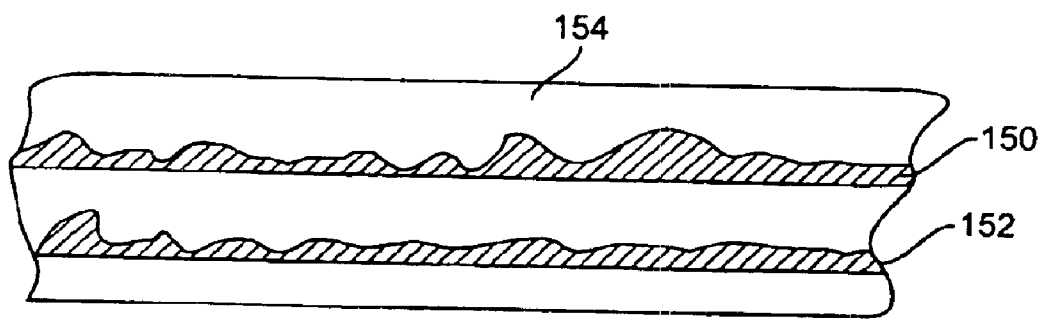
FIG. 12 shows a cross-sectional view of a vibration absorber having mass layers with masses of varying thicknesses.

In another configuration the multiple mass resonance layers with varying mass layer properties can be used. FIG. 12 shows one arrangement of such a system with two resonance mass layers 150 and 152 embedded in foam as a spring material 154. It is understood that the mass layers can be continuous or in discrete sections. Such a device has the advantage of two resonances and thus a broader frequency range of vibration control. FIG. 12 shows the mass layer 150 having larger thicknesses at locations where mass layer 152 is relatively thinner. Varying the thickness of the mass layer 150 or 152 will provide the vibration absorber with different resonance characteristics, and varying the thickness of the mass layer 150 and 152 relative to one another at the same relative location in the Z axis can allow two different resonances to be simultaneously addressed.

Figure 13:
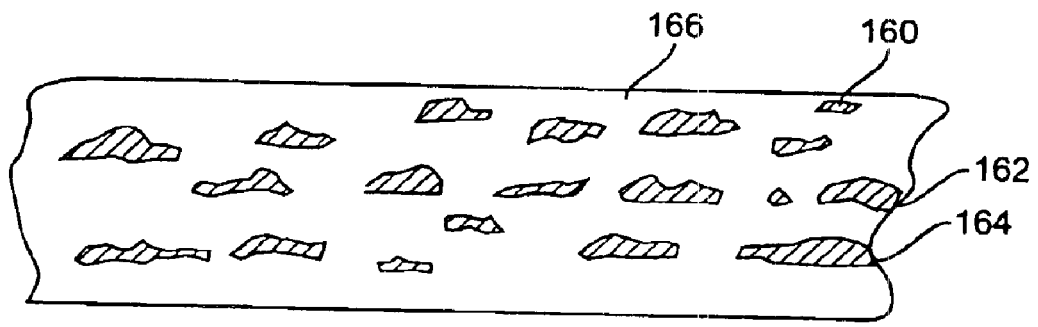
FIG. 13 shows a cross-sectional view of a vibration absorber having mass layers of discretized masses (not integral as is shown in FIG. 12), again with masses of different thicknesses at different locations.

In another configuration shown in FIG. 13 the mass layers 160 and 162 and 164 are segmented and are located at different depths in the spring material 166 such as foam. The different depths alter the stiffness of the spring material supporting each mass. Such an arrangement leads to multiple resonance frequencies of the devices due to the multiple depths and thus spring rates at which the masses are embedded. The multiple resonance frequencies lead to a very broadband of frequencies over which the device is effective. It is noted that the embedded discretized masses can be of any general shape. In addition different materials described above can be used for the spring system (e.g., rubber, fiberglass batting, spring metal, urethane, or the like) FIG. 13 shows that many different mass layers can be used, the mass layers can be discretized (i.e., segmented), and the mass layers can have segments which are of different thicknesses. These layers 160, 162, and 164 can be made in a controlled fashion for tuning at specific frequencies at specific locations, but more preferably, can be applied in a random fashion so as to achieve a vibration absorbing device suitable for multiple resonance frequencies. In addition, the device shown in FIG. 13 can be used in both active and passive vibration control systems as discussed below.

In variations on the embodiments shown in FIGS. 12 and 13, active elements such as curved piezoelectric polymers and ceramics as well as electromagnetic actuators can be embedded in the spring material to apply active forces to change the motion of the mass elements. Such a device will have improved performance when used in conjunction with an electrical control approach as discussed previously. In particular, the active control, coupled with the varying masses at one or more levels within the elastic layers, will allow for significantly improved vibration damping in many applications.

Figure 14:
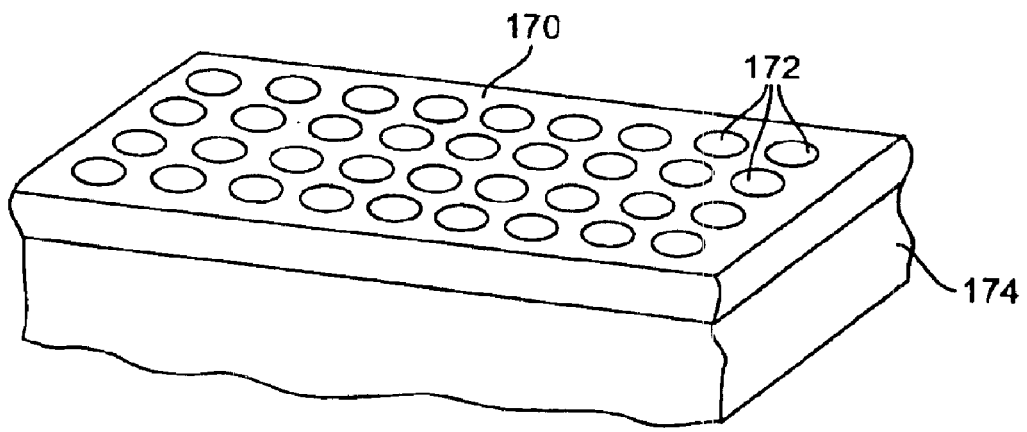
FIG. 14 shows the DAVA with a perforated mass layer which allows vibratory sound or other vibratory input on the side of the DAVA opposite the structure undergoing damping to penetrate into the elastic layer, and be damped using the combination of the elastic layer and mass layer, and, additionally, the structure of FIG. 14 can be used to reduce unwanted sound radiation from the top mass layer.

FIG. 14 shows another embodiment of the device where the mass layer 170 consists of perforated material (e.g., perforated lead or steel, etc). With such an arrangement the vibration absorber is also able to absorb acoustic waves incident on its surface that propagate through the perforations 172 as well as control vibrations of the base structure under the elastic material 174. This embodiment prevents the mass layer 170 from acting like an acoustic source (i.e., in some applications, a integral "layer" for the mass will transmit acoustic signals from the damped structure which emanate through the elastic material to the ambient environment). Furthermore, vibrations or acoustic signals from the ambient environment might also pass through the perforations and be damped by the vibration absorber in addition to the vibrations from the structure (underlying elastic layer 174) which are damped by the vibration absorber. As discussed above in conjunction with FIGS. 12 and 13, the configuration of FIG. 14 can be used with both active and passive devices (active devices being those which includes embedded PVDF or piezo ceramics or other materials which can expand or contract under an applied voltage; passive devices simply including the mass layer 172 and elastic material 174 (but which can also have embedded spring material (e.g., metals, etc.))). Furthermore, the configuration of FIG. 14 may also be used in combination with embedded discretized masses at one or more planes within the elastic material as is shown in FIGS. 13 and 15, and the discretized masses may vary in size, shape and weight.

Figure 15:
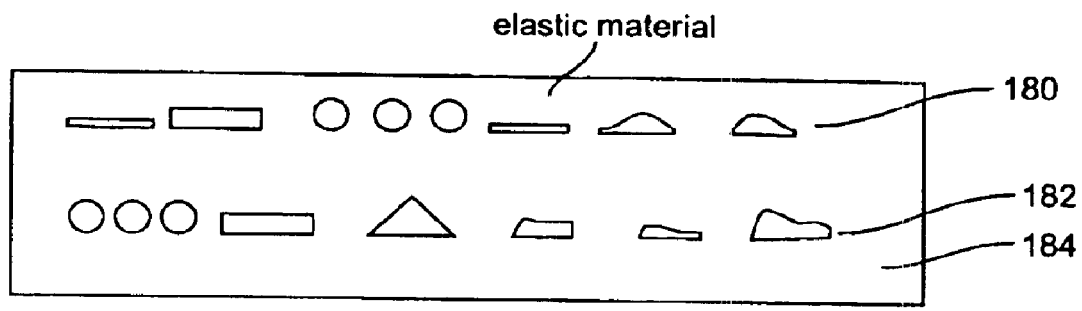
FIG. 15 shows a cross-section of a vibration absorber having discretized masses of different sizes and shapes in different mass layers.

FIG. 15 shows a vibration absorber with embedded discretized mass layers 180 and 182 in an elastic material 184. FIG. 15 illustrates the use of masses of different sizes and shapes. These can be randomly distributed for achieving damping of a wide range of resonance frequencies, or they can be applied in a prescribed pattern to tune the frequency response at specific locations in the vibration absorber to specific frequencies. Some of the masses may be ball bearing type spheres, while others may be flat thin rectangles. The shape of the mass will influence the responsiveness to different vibration frequencies in different ways which are controllable as desired by the fabricator.

The vibration absorbers shown in FIGS. 12–15 can be made by a variety of techniques, the simplest of which involves applying a layer of foam, depositing a layer of integral or discretized masses, followed by repeating the foam and mass layer process several times. Alternatively, the mass layers may be embedded within the elastic material during fabrication of the elastic material. Alternatively, the elastic material may be cut at selected locations and the mass sections inserted into the elastic material via the cut. Once inserted the elasticity of the material holds the mass in position and closes the cut.

Figure 16:
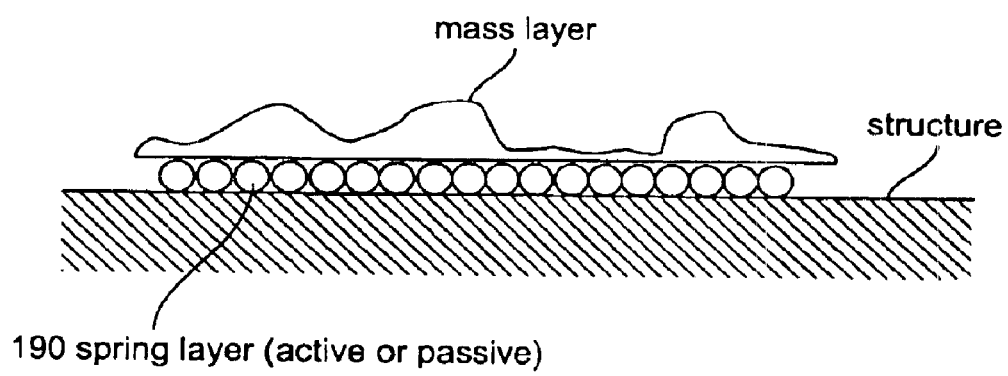
FIG. 16 shows a mass layer supported by an active or passive spring layer comprising PVDF or elastic material arranged in tubes.

FIG. 16 shows a DAVA or vibration absorber in which the active spring layer consists of tubes 190 of PVDF or plastic like material or the like, respectively for active or passive applications respectively. Since the tubular shape is a full extension of the curved corrugation shapes and retains the curvature along the plane of the absorber, electrical activation will still provide normal active inputs to the mass. However, with the tubular structure, the diameter of the tubes can be more easily adjusted and sized to provide damping of the DAVA or vibration absorber due to viscous losses of fluid being pumped in and out of the tubes.

While the invention has been described in terms of a single preferred embodiment, those skilled in the art will recognize that the invention can be practiced with modification within the spirit and scope of the appended claims.

What is claimed is:

1. A vibration absorber for controlling vibration and sound radiation over an extended area of a vibrating structure, comprising:
   a distributed elastic element distributed along an area of the vibrating structure;
   a mass associated with the distributed elastic element which is spaced away from said vibrating structure; and
   an elastic material, said distributed elastic element being embedded within said elastic material,
   wherein said elastic material is selected from the group consisting of acoustic foam, acoustic fiberglass, fiberglass batting, and distributed spring material.

2. The vibration absorber of claim 1 wherein said distributed elastic element is selected from the group consisting of polyvinylidene fluoride, piezoelectric ceramic, metal, polymer and electromechanical devices.

3. The vibration absorber of claim 1 wherein said elastic material is rubber and said distributed elastic element is polyvinylidene fluoride.

4. The vibration absorber of claim 1 wherein said elastic material is solid urethane and said distributed elastic element is polyvinylidene fluoride.

5. The vibration absorber of claim 1 wherein said elastic material is foam or distributed spring material, and said distributed elastic element is polyvinylidene fluoride.

6. The vibration absorber of claim 1 wherein said distributed elastic element has a waved shape along at least one dimension.

7. The vibration absorber of claim 1 wherein said mass is adhered to a surface of said distributed elastic element.

8. A vibration absorber for controlling vibration and sound radiation over an extended area of a vibrating structure, comprising:
   a distributed elastic element distributed along an area of the vibrating structure; and
   a mass associated with the distributed elastic element which is spaced away from said vibrating structure;
   wherein said mass is comprised of distributed discrete mass sections.

9. The vibration absorber claim 8 wherein at least two of said discrete mass sections are, with respect to each other, at least one of:
different in size,
different in shape, and
different in thickness.

10. The vibration absorber of claim 8 wherein said discrete mass sections are embedded within said elastic material.

11. The vibration absorber of claim 8 wherein said discrete mass sections are embedded within said elastic material in at least two different planes.

12. The vibration absorber of claim 8 wherein said discrete mass sections include at least one mass section on a surface of said elastic material and another mass section embedded within said elastic material.

13. The vibration absorber of claim 9 wherein said two discrete mass sections are embedded within said elastic material at different planes.

14. The vibration absorber of claim 9 wherein a first of said two discrete mass sections is present on a surface of said elastic material, and a second of said two discrete mass sections is embedded within said elastic material.

15. A vibration absorber for controlling vibration and sound radiation over an extended area of a vibrating structure, comprising:
a distributed elastic element distributed along an area of the vibrating structure; and
a mass associated with the distributed elastic element which is spaced away from said vibrating structure;
wherein said distributed elastic element includes one or more tubular elements.

16. The vibration absorber of claim 15 wherein said one or more tubular elements are composed of polyvinylidene floride (PVDF).

17. The vibration absorber of claim 15 wherein said one or more tubular elements are composed of a material selected from the group consisting of metals and plastic.

18. A vibration absorber for controlling vibration and sound radiation over an extended area of a vibrating structure, comprising:
a distributed elastic element distributed along an area of the vibrating structure; and
a mass associated with the distributed elastic element which is spaced away from said vibrating structure;
wherein said mass is perforated.

19. The vibration absorber of claim 18 wherein said mass is comprised of metal.

20. The vibration absorber of claim 19 wherein said metal is selected from the group consisting of lead and steel.

21. The vibration absorber of claim 18 wherein an amount of perforations in said mass is sufficient to reduce or eliminate sound vibrations from emanating from a top of said mass layer.

22. The vibration absorber of claim 18 wherein an amount of perforations in said mass is sufficient to permit sound from an ambient environment to penetrate into said distributed elastic element through said mass layer.

23. A distributed active vibration absorber (DAVA) for controlling vibration and sound radiation over an extended area of a vibrating structure, comprising:
an active elastic layer including a distributed actuator embedded within an elastic material, said active elastic layer is distributed along an area of the vibrating structure; and
a plurality of discrete mass segments associated with the elastic material of the active elastic layer.

24. The DAVA of claim 23 wherein said discrete mass segments are distributed uniformily over an area of said elastic material.

25. The DAVA of claim 23 wherein said discrete mass segments are distributed non-uniformly over an area of said elastic material.

26. The DAVA of claim 23 wherein at least two of said discrete mass segments are, with respect to each other, at least one of:
different in size,
different in shape, and
different in thickness.

27. The DAVA of claim 23 wherein said elastic material includes at least one material selected from the group consisting of acoustic foam, acoustic fiberglass, fiberglass batting, distributed spring material, urethane, and rubber.

28. The DAVA of claim 23 wherein said embedded distributed actuator is selected from the group consisting of polyvinylidene fluoride, piezoelectric ceramic, metal and electromechanical devices.

29. The DAVA of claim 23 wherein said elastic material is rubber and said distributed actuator is polyvinylidene fluoride.

30. The DAVA of claim 23 wherein said elastic material is solid urethane and said distributed actuator is polyvinylidene fluoride.

31. The DAVA of claim 23 wherein said elastic material is foam or distributed spring material, and said distributed actuator is polyvinylidene fluoride.

32. The DAVA of claim 23 wherein said distributed actuator has a waved shape along at least one dimension.

33. The DAVA of claim 23 further comprising electrodes positioned on said distributed actuator.

34. The DAVA of claim 23 wherein said plurality of discrete mass segments are embedded within the elastic material.

35. The DAVA of claim 34 wherein said discrete mass segments are embedded within said elastic material in at least two different planes.

36. The DAVA of claim 23 wherein said discrete mass segments include at least one mass section on a surface of said elastic material and another mass section embedded within said elastic material.

37. The DAVA of claim 26 wherein said two discrete mass segments are embedded within said elastic material at different planes.

38. The DAVA of claim 26 wherein a first of said two discrete mass sections is present on a surface of said elastic material, and a second of said two discrete mass sections is embedded within said elastic material.

39. The DAVA of claim 23 wherein said distributed elastic element includes one or more tubular elements.

40. The DAVA of claim 23 wherein said one or more tubular elements are composed of polyvinylidene floride (PVDF).

41. The DAVA of claim 23 wherein said one or more tubular elements are composed of a material selected from the group consisting of metals and plastic.

42. The DAVA of claim 23 further comprising a mass layer positioned on a surface of said elastic material.

43. The DAVA of claim 42 wherein said mass layer includes a plurality of perforations extending therethrough.

44. The DAVA of claim 43 wherein an amount of perforations in said mass is sufficient to reduce or eliminate sound vibrations from emanating from a top of said mass layer.

45. The DAVA of claim 43 wherein an amount of perforations in said mass is sufficient to permit sound from an ambient environment to penetrate into said distributed elastic element through said mass layer.

46. The DAVA of claim 42 wherein said mass layer is selected from the group consisting of lead and steel.

47. A vibration absorber for controlling vibration and sound radiation over an extended area of a vibrating structure, comprising:
   an elastic layer formed from an elastic material, said active elastic layer is distributed along an area of the vibrating structure; and
   a plurality of discrete mass segments associated with the elastic material of the active elastic layer.

48. The vibration absorber of claim 47 wherein at least two of said discrete mass segments are, with respect to each other, at least one of:
   different in size,
   different in shape, and
   different in thickness.

49. The vibration absorber of claim 47 wherein said elastic material includes at least one material selected from the group consisting of acoustic foam, acoustic fiberglass, fiberglass batting, distributed spring material, urethane, and rubber.

50. The vibration absorber of claim 47 wherein said plurality of discrete mass segments are embedded within the elastic material.

51. The vibration absorber of claim 50 wherein said discrete mass segments are embedded within said elastic material in at least two different planes.

52. The vibration absorber of claim 50 wherein said discrete mass segments include at least one mass section on a surface of said elastic material and another mass section embedded within said elastic material.

53. The vibration absorber of claim 50 wherein said two discrete mass segments are embedded within said elastic material at different planes.

54. The vibration absorber of claim 50 wherein a first of said two discrete mass sections is present on a surface of said elastic material, and a second of said two discrete mass sections is embedded within said elastic material.

55. The vibration absorber of claim 47 wherein said distributed elastic element includes one or more tubular elements.

56. The vibration absorber of claim 55 wherein said one or more tubular elements are composed of polyvinylidene floride (PVDF).

57. The vibration absorber of claim 55 wherein said one or more tubular elements are composed of a material selected from the group consisting of metals and plastic.

58. The vibration absorber of claim 47 further comprising a mass layer positioned on a surface of said elastic material.

59. The vibration absorber of claim 58 wherein said mass layer includes a plurality of perforations extending therethrough.

60. The vibration absorber of claim 59 wherein an amount of perforations in said mass is sufficient to reduce or eliminate sound vibrations from emanating from a top of said mass layer.

61. The vibration absorber of claim 59 wherein an amount of perforations in said mass is sufficient to permit sound from an ambient environment to penetrate into said distributed elastic element through said mass layer.

62. The vibration absorber of claim 58 wherein said mass layer is selected from the group consisting of lead and steel.

63. A vibration absorber for controlling vibration and sound radiation over an extended area of a vibrating structure, comprising:
   an elastic layer distributed over said extended area of said vibrating structure;
   a mass positioned on said elastic layer which is spaced away from said vibrating structure by a thickness of said elastic layer, said mass having a plurality of perforations extending therethrough.

64. The vibration absorber of claim 63 wherein an amount of perforations in said mass is sufficient to reduce or eliminate sound vibrations from emanating from a top of said mass layer.

65. The vibration absorber of claim 63 wherein an amount of perforations in said mass is sufficient to permit sound from an ambient environment to penetrate into said distributed elastic element through said mass layer.

66. The vibration absorber of claim 63 wherein said mass layer is selected from the group consisting of lead and steel.

67. The vibration absorber of claim 63 wherein said elastic layer includes a distributed active element.

68. The vibration absorber of claim 67 wherein said distributed active element is polyvinylide fluoride (PVDF).

69. The vibration absorber of claim 63 further comprising a plurality of mass segments distributed within said elastic layer.

70. The vibration absorber of claim 69 wherein said plurality of mass segments are distributed at a plurality of different planes within said elastic layer.

71. A vibration absorber for controlling vibration and sound radiation over an extended area of a vibrating structure, comprising:
   a distributed elastic element positioned over said extended area of said vibrating structure, said distributed elastic element comprising a plurality of tubular components;
   a mass positioned on said distributed elastic element which is spaced away from said vibrating structure by a thickness of said distributed elastic element.

72. The vibration absorber of claim 71 wherein said mass has a plurality of perforations extending therethrough.

73. The vibration absorber of claim 71 wherein said distributed elastic element is polyvinylidene fluoride (PVDF).

74. The vibration absorber of claim 71 wherein said distributed elastic element is selected from the group consisting of plastics and metals.

* * * * *

UNITED STATES PATENT AND TRADEMARK OFFICE
CERTIFICATE OF CORRECTION

PATENT NO. : 6,958,567 B2  
DATED : October 25, 2005  
INVENTOR(S) : Fuller et al.

It is certified that error appears in the above-identified patent and that said Letters Patent is hereby corrected as shown below:

Column 15,
Lines 11 and 14, delete "active".

Signed and Sealed this

Fourth Day of April, 2006

JON W. DUDAS
*Director of the United States Patent and Trademark Office*

UNITED STATES PATENT AND TRADEMARK OFFICE
CERTIFICATE OF CORRECTION

PATENT NO. : 6,958,567 B2  Page 1 of 1
APPLICATION NO. : 10/429246
DATED : October 25, 2005
INVENTOR(S) : Fuller et al.

It is certified that error appears in the above-identified patent and that said Letters Patent is hereby corrected as shown below:

In column 1 after the title please add the follow paragraph:

--This invention was made with government support under Grant No. N00014-94-1-1140 by the Office of Naval Research. The government has certain rights in this invention.--

Signed and Sealed this

Tenth Day of April, 2007

JON W. DUDAS
*Director of the United States Patent and Trademark Office*